(No Model.)

J. J. JOHNSTON.
GRIDIRON.

No. 265,608. Patented Oct. 10, 1882.

WITNESSES
Fred. G. Dieterich.
P. C. Dieterich.

INVENTOR
James J. Johnston

UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

GRIDIRON.

SPECIFICATION forming part of Letters Patent No. 265,608, dated October 10, 1882.

Application filed February 11, 1882. (No model.)

*To all whom it may concern:*

Be it known that I, JAMES J. JOHNSTON, of Columbiana, in the county of Columbiana and State of Ohio, have invented a certain new and useful Improvement in Gridirons; and I do hereby declare that the following is a full, clear, and exact description thereof, reference being had to the accompanying drawings, and to the letters of reference marked thereon.

My invention relates to an improvement in gridirons; and it consists in making it in the form of an ordinary skillet for a stove, and provided with a fire chamber, above which is a detachable arched grate having grooved bars and ring, having a drip-reservoir, all of which will hereinafter more fully and at large appear.

To enable others skilled in the art with which my invention is most nearly connected to make and use it, I will proceed to describe its construction and operation.

Figure 1:
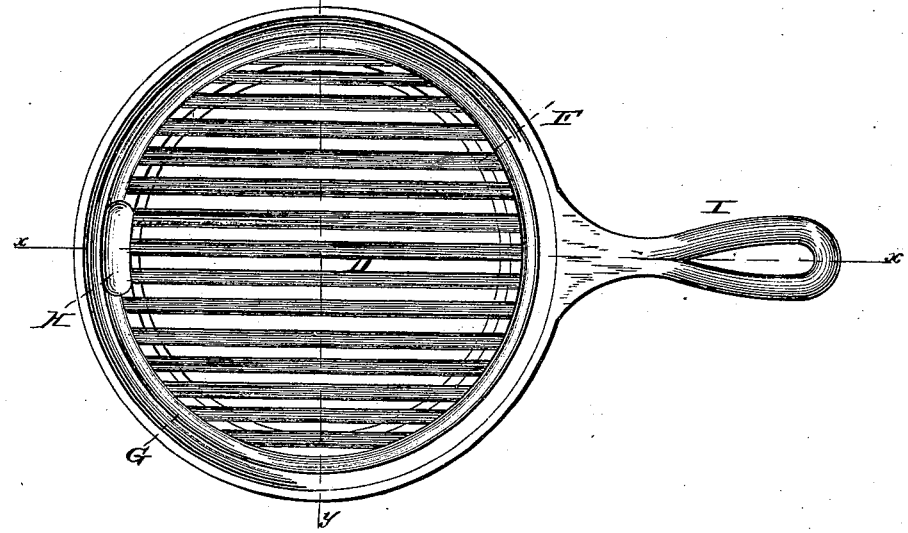
Figure 2:
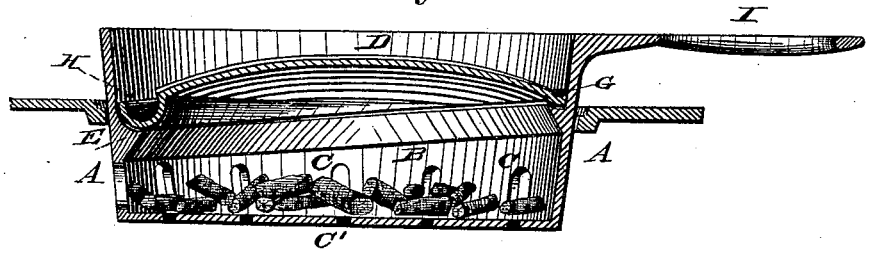
Figure 3:
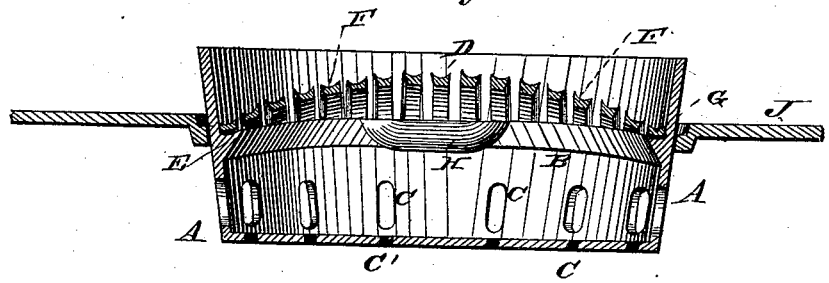

In the accompanying drawings, which form part of my specification, Figure 1 is a top view or plan of my improvement in gridirons. Fig. 2 is a vertical section of the same at line *x x* of Fig. 1. Fig. 3 is a vertical section of the same at line *y y* of Fig. 1.

Reference being had to the accompanying drawings, A represents the body or case of the gridiron, which is furnished with a fire-chamber, B, the bottom and side walls of which have a large number of openings, C.

Above the fire-chamber B is an inwardly-projecting flange, E, upon which rests a detachable arched grate, D, having grooved bars F, grooved ring G, and drip-reservoir H, with which grooves of the bars F and ring communicate.

The body or case A is provided with a handle, I, similar to that of the skillet of an ordinary cooking-stove, which body or case A is represented as being placed in the opening of a stove-top marked J, for the purpose of showing the relation of the gridiron to a stove when broiling.

As the construction of my improvement in gridirons will be readily understood from the foregoing description and reference to the accompanying drawings, I will proceed to describe its operation, which is as follows: Charcoal is placed in the fire-chamber B, the detachable grate is placed on the flange E, and the body or case A is then placed in the opening over the fire of the cooking-stove, as indicated in Figs. 2 and 3, where the charcoal in chamber B will soon ignite. When it is thoroughly burning the cook places the meat or article to be broiled on the grate D. The juices and fat, if the article is meat, will run down the grooves of the bars F into the groove of the ring G, and from it into the drip-reservoir H, from which it may be dipped out for the purpose of "basting" the meat during the process of broiling it.

By the gridiron hereinbefore described meat and other articles can be broiled over a charcoal-fire in connection with the ordinary cooking-stove in which anthracite or bituminous coal or coke is used, which is very desirable, for meat broiled over a fire of the kind stated is always affected by being charged with the sulphurous gas evolved from the coal or coke, thereby injuring its flavor; but by the gridiron constructed as hereinbefore described this objection is overcome, and, instead of the meat being impregnated with sulphurous gases, it will be subjected to the action of the carbonic-acid gas evolved from the burning charcoal, which not only destroys any rancidity that may be in the meat, but also imparts an agreeable and healthful flavor to the meat; and, in addition to this, the juices which flow from the meat in the process of broiling are collected through the medium of the grooves in the bars and ring into the drip-reservoir H of the grate D, from which it can be dipped and poured over the meat for the purpose of basting it, the advantage of which is well understood by the experienced cook.

Having thus described my invention, what I claim as new, and desire to secure by Letters Patent, is—

A gridiron consisting of the body or case A, having an internal flange, E, an arched and detachable grate, D, having grooved bars F, grooved ring G, and reservoir H, constructed, arranged, and operating substantially as herein described, and for the purpose set forth.

JAMES J. JOHNSTON.

Witnesses:
 A. C. JOHNSTON,
 T. D. D. OURAND.